United States Patent
Hall et al.

(10) Patent No.: US 6,242,536 B1
(45) Date of Patent: *Jun. 5, 2001

(54) PROCESS FOR PREPARATION OF BLOCK COPOLYMERS IN MIXED ALKANE/CYCLOALKANE SOLVENTS

(75) Inventors: James E. Hall, Mogadore; Daniel F. Graves, Canal Fulton; Hideo Takeichi, Akron, all of OH (US)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,925

(22) Filed: Dec. 11, 1997

(51) Int. Cl.[7] .................. C08F 293/00; C08F 297/02; C08F 297/04
(52) U.S. Cl. .................. 525/271; 525/313; 525/314; 525/315; 525/316; 525/250; 525/267
(58) Field of Search .................. 525/250, 267, 525/271, 313, 314, 315, 316

(56) References Cited

U.S. PATENT DOCUMENTS

| | | |
|---|---|---|
| 3,231,635 | 1/1966 | Holden et al. . |
| 3,265,765 | 8/1966 | Holden et al. . |
| 3,427,364 | 2/1969 | Shaw et al. . |
| 4,092,375 | 5/1978 | Vreugdenhil . |
| 4,939,208 * | 7/1990 | Lanza et al. ................... 525/93 |

FOREIGN PATENT DOCUMENTS

| | | |
|---|---|---|
| 1090036 * | 11/1980 | (CA) . |
| 2325314 | 5/1973 | (DE) . |
| 1008188 * | 10/1965 | (GB) . |
| 1130770 | 12/1966 | (GB) . |
| 1412584 | 11/1971 | (GB) . |

* cited by examiner

*Primary Examiner*—Jeffrey Mullis
(74) *Attorney, Agent, or Firm*—David G. Burleson; Scott A. McCollister

(57) ABSTRACT

The dispersibility of the initial polystyrene block in forming a S-B-S type of copolymer is improved by first preparing a small block of homopolydiene such as homopolybutadiene as a dispersing agent. Onto this small block of homopolybutadiene, the first block of polystyrene is formed and affixed and thereby made dispersible in a mixture of alkanes and 15 to 60% by weight of cycloalkanes, preferably hexane and cyclohexane. After the preparation of the dispersing agent and the first styrene block, the remaining monomer charges to the reactor are fed in aliphatic hydrocarbon diluents, preferably hexane or technical hexane, thereby greatly reducing the final percentage of cycloalkanes including cyclohexane in the reactor to less than 25% of total dispersing medium. The block copolymers produced according to the present process display a narrow molecular weight distribution and improved tensile strength over block copolymers produced in the absence of the additional cycloalkanes in the solvent system.

15 Claims, No Drawings

PROCESS FOR PREPARATION OF BLOCK COPOLYMERS IN MIXED ALKANE/CYCLOALKANE SOLVENTS

FIELD OF THE INVENTION

This invention relates to dispersion polymerization of block copolymers and to the control of the composition of the dispersing agent to effect the properties of the block copolymers.

BACKGROUND OF THE INVENTION

Block copolymers of the S-B-S type and processes for their preparation are well known in art for such uses as self-curing elastomers and as modifiers for diene elastomers. These block copolymers have a central core of a polybutadiene and have a block of polystyrene on each end. However, in view of the greater insolubility or non-dispersibility of the initial polystyrene, a solvent such as an aromatic hydrocarbon or cyclohexane has been used in its preparation.

This problem is recognized in British Patent No. 1,130,770 which states on page 2, lines 60–65, "In each of these processes, however, a vinyl aromatic hydrocarbon is required to be first polymerized and therefore the polymerization solvent used must be wholly or mainly a naphthenic or aromatic hydrocarbon solvent".

Similar recognition of this solubility problem is indicated in U.S. Pat. Nos. 3,231,635; 3,265,765 and 3,427,364 wherein statements are made regarding the necessity to use aromatic or naphthenic solvents or mixtures of these with other solvents.

British Patent No. 1,412,584 has modified the process of preparing block copolymers so that heptane may be used as the polymerization medium, by making first a block of t-butyl-styrene and describes this first block as a thermoplastic polymer of 10,000 to 100,000 molecular weight to give solubility to the growing block copolymer. The second or middle block of polybutadiene is then added and finally a block of polystyrene. The resulting block copolymer is poly(t-Bu-styrene)-polybutadiene-polystyrene.

U.S. Pat. No. 4,291,139 effects polymerization of block copolymers of the S-B-S type wherein S represents a block of polystyrene and B represents a block of polybutadiene using hexane as diluent by first preparing a "foot" or small block of homopolydiene to which the initial polystyrene block is thereafter attached. This small block of homopolydiene represents no more than 12 parts, preferably no more than 10 parts by weight of homopolydiene per 100 parts by weight of the block of polystyrene to which it is attached. Generally, therefore, this block has a molecular weight of 200–5000 depending on the size of the attached polystyrene block and is not large enough to alter the properties of the resultant S-B-S block copolymers except to give the initial polystyrene block greater dispersibility in hexane. This process is entirely conducted in a hexane solvent.

Because of its lower boiling point and resultant energy savings in the use of hexane as compared to benzene and cyclohexane, it is desirable to have a process for use in preparing S-B-S block copolymers wherein the final block copolymer is recoverable from a dispersing medium primarily containing low boiling alkanes such as hexane. Moreover, the use of a process primarily conducted in alkanes such as hexane makes the process adaptable for use in equipment designed for the preparation of polybutadiene in hexane.

SUMMARY OF THE INVENTION

In accordance with the present invention, the dispersibility of the initial polystyrene block in forming a S-B-S type of copolymer is improved by first preparing a small block of homopolydiene such as homopolybutadiene as a dispersing agent, representing 2–12 parts, preferably 5–10 parts, by weight per 100 parts by weight of the adjacent polystyrene block, and generally having a molecular weight of 200–5,000, depending on the molecular weight of the adjacent polystyrene block. Onto this small block of homopolybutadiene, the first block of polystyrene is formed and affixed and thereby made dispersible in a mixture of alkanes and cycloalkanes, preferably hexane and cyclohexane. This small block of polydiene is not large enough to alter the desired properties of the ultimate S-B-S block copolymer. This modification involves the same or similar techniques as previously used in the preparation of S-B-S polymers except that a combination of alkanes, preferably hexane or technical hexane, and 15 to 60% by weight of cycloalkanes, preferably cyclohexane, is used as the dispersing medium and a small amount of a conjugated diene is added prior to the addition of the amount of styrene used for the formation of the first polystyrene block. After the preparation of the dispersing agent and the first styrene block, the remaining monomer charges to the reactor are fed in aliphatic hydrocarbon diluents, preferably hexane or technical hexane, thereby greatly reducing the final percentage of cycloalkanes including cyclohexane in the reactor to less than 25% of total dispersing medium. The block copolymers produced according to the present process display a narrow molecular weight distribution and improved tensile strength over block copolymers produced in the absence of the additional cycloalkanes used in the solvent system.

DETAILED DESCRIPTION OF THE INVENTION

The present invention relates to a dispersion polymerization process for preparing block polymers having high tensile strength through the subsequent steps of:
(1) forming a polymerization mixture by polymerizing vinyl aromatic monomer in the presence of a polydiene containing dispersing agent (polyBd* or b*) and an organolithium initiator in a dispersing medium containing alkanes or aliphatic hydrocarbons and 15 to 60% by weight of cycloalkanes, preferably cyclohexane, to form a stable dispersion until substantially complete conversion to form a first vinyl aromatic block S; (2) adding conjugated diene monomer in an alkane containing diluent having less than 9% by weight of cycloalkane to the polymerization mixture and polymerizing the conjugated diene monomer until substantially complete conversion to form a diblock polymer S-B; (3) and adding to the polymerization mixture a coupling agent (X) having multiple functionality and coupling the diblock polymer formed in step (2) to form a final block polymer having the structural formula S-B-X-(B-S)$_{n-1}$ wherein n is 1, 2, 3 or more and recovering the final block polymer.

Alternatively the dispersion polymerization process for preparing block polymers having high tensile strength can be performed by the subsequent steps of: (1) forming a polymerization mixture by polymerizing a first charge of vinyl aromatic monomer in the presence of a dispersing agent and an organolithium initiator in a dispersing medium containing alkanes or aliphatic hydrocarbons and 15 to 60% by weight of a cycloalkane, preferably cyclohexane, to form a stable dispersion until substantially complete conversion to form a first vinyl aromatic block S; (2) adding conjugated diene monomer in an alkane containing diluent having less than 9% by weight of cycloalkane to the polymerization mixture and polymerizing the conjugated diene monomer until substantially complete conversion to form a diblock polymer S-B; and (3) adding to the polymerization mixture a second charge of vinyl aromatic monomer in an alkane containing diluent having less than 9% by weight of cycloalkane and polymerizing the vinyl aromatic monomer to form a terminal block $S_1$ on the S-B diblock polymer to form a block polymer S-B-S, in an alkane containing diluent having less than 25% by weight of cycloalkane.

As in previous practice, a hydrocarbon lithium is used as the initiator, preferably either a secondary or tertiary alkyl lithium, or a primary alkyl lithium such as n-butyl lithium with or without a small amount of a suitable modifier to accelerate the initiation step.

To the polymerization system containing an appropriate amount of initiator is added the small amount of a diene required to yield the small soluble block of polydiene resulting in the formation represented by the designation polyBd* or b*. When this small block formation is completed, the appropriate amount of styrene is added to give the desired molecular weight in the first polystyrene of S block. Polymerization is continued until conversion of the styrene monomer to polymer is substantially completed. Then a conjugated diene such as butadiene is added to form the middle polydiene block. At the end of this block formation, the copolymer has the structure:

b* -polystyrene-polydiene-Li

At this point, the polymer may be coupled with any one of well-known coupling agents such as an alkyl dichloride of 1–10 carbon atoms, carbon monoxide, $R_2SiCl_2$, $RSiCl_3$, $SiCl_4$, poly($PNCl_2$) or $(PNCl_2)_x$, divinylbenzene, alkyl esters, alkyl diesters, alkyl triesters, and $CCl_3COOR$ wherein R represents an alkyl group of 1–10 carbon atoms, and the like to produce block copolymers having the structure:

b*-polystyrene-polydiene-polystyrene-b*

In this block polymer product, the residue of the coupling agent is in the middle of the polydiene block. Since it is relatively minute compared to the size of the total copolymer, it has no noticeable effect on the characteristics of the block copolymer. The amount of conjugated diene such as butadiene used in preparing the polydiene block which is to be coupled is half the amount needed to give the desired molecular weight in the ultimate polydiene block in the final block copolymer. Moreover, because of the small size of the terminal b* blocks, these blocks have very little effect on the characteristics or properties of the block copolymer so that it behaves essentially as an S-B-S type of block copolymer.

Generally in all of the polymers produced in accordance with the present invention the polydiene* block has a molecular weight of 200–5000 depending on the size of the attached polystyrene blocks and is not large enough to alter the properties of the resultant block copolymer.

When the coupling agent is difunctional such as with the alkane dichlorides, dialkyl $SiCl_2$, carbon monoxide, etc., the coupled product is of the true S-B-S type or more appropriately of the b*-S-B-S-b* type. However, when the coupling agent is trifunctional, tetrafunctional or of higher functionality such as with $CCl_4$, $SiCl_4$, divinylbenzene, $CCl_3COOEt$, etc., the coupled product may be represented as b*-S-B(-S-b*)$_n$, where n may be an integer having a value of 2, 3 or more. Where this formula is used to include the products obtained with difunctional coupling agents, n has a value of one. Therefore, the value of n is generally defined as having a value of 1 to 6.

The appropriate amount of coupling agent is calculated on the amount needed to react with the number of lithium atoms present in the polymer. For example, with a tetrafunctional coupling agent, such as $CCl_4$, one-fourth of the molecular weight of $CCl_4$ is calculated as required for each molecule of polymer or in other words, each atom of lithium present.

For simplicity and because the small size of the b* block has little effect on the ultimate properties of the block copolymer, the products are generally referred to as the S-B-S or S-B(-S)$_n$ type of block copolymer. However, where the terminal b* blocks have more than the 12 parts of polybutadiene as defined herein, then various properties such as the green strength of the ultimate block copolymer may be adversely affected.

As previously mentioned, the residue of the coupling agent is buried in the middle of a B or polybutadiene block and is so minute in comparison with the bulk of the polybutadiene block that it has no noticeable effect on the properties of the block copolymer. Moreover, when a trifunctional or higher functional coupling agent is used, the resultant center polybutadiene block may be branched in accordance with the functionality of the coupling group. For example, a trifunctional coupling agent may produce a triple branched polybutadiene whereas a tetrafunctional coupling agent, such as $CCl_4$ may produce a four-branched polybutadiene center block, depending on the proportions used. As a by-product, the Li is removed by reaction with chlorine and precipitated from the hexane solution as LiCl.

If desired, the coupling step may be omitted and the ultimate block copolymers may be prepared by using sufficient butadiene to form the desired molecular weight in the ultimate middle polyBd block and when this formation is completed the appropriate amount of styrene is added to form the second polystyrene block. Then the Li is deactivated and removed by the addition of appropriate agents for this purpose, such as an alcohol, water, etc. The resultant block copolymer has the structure:

polyBd*-polystyrene-polyBd-polystyrene

The preparation of the block copolymer by the coupling technique has the advantage that during the formation of the ultimate middle polybutadiene block the copolymer has two terminal polybutadiene blocks which aid in the dipersibility during polymerization. However, the product derived from the completely sequential block formation has the advantage of having in the ultimate product only one of the small terminal polyBd* blocks. Which advantage is of greater importance depends on the particular circumstances during preparation and the particular results desired in the product.

The dienes which may be used in preparing the initial small polydiene block are conjugated dienes, preferably conjugated dienes having 4–8 carbon atoms such as butadiene-1,3; isoprene; pentadiene-1,3; 2,3 dimethylbutadiene-1,3; etc. While butadiene-1,3, herein referred to as butadiene, is preferred for the middle polyBd block, other conjugated dienes may be used for this purpose. Additionally the small polydiene block may contain up to 50% by weight of alkane soluble monomers such as t-butyl styrene. Although vinyl toluene may be used in place of some or all of the styrene in the S block, styrene is preferred.

The process according to the present invention is performed in the following manner. First, any desirable dispersing agent is prepared in a reactor or reaction zone by polymerizing suitable monomers, particularly diene monomers, to form a small block, (polyBd* or b*), in a suitable diluent in the presence of an anionic initiator. The resulting dispersing agent block polymer precursor is "living", because a catalytically active anion is present at the terminal end of the block polymer precursor. The initial dispersing agent may be formed contemporaneously with the formation of the first block S thereby producing a tapered block (b/S) which is dispersible in the dispersing medium primarily consisting of alkanes or aliphatic hydrocarbons and 15 to 60% by weight of cycloalkanes, preferably cyclohexane. The anion is capable of initiating polymerization of further monomers in the reaction zone. Suitable solvents, also known as the dispersing medium, used in the present polymerization process are aliphatic hydrocarbons, such as cycloaliphatic, branched and linear aliphatic hydrocarbons, including butane, pentane, hexane, heptane, isopentane, octane, isooctane, nonane, cyclohexane, isohexane and the like and mixtures thereof, however the initial dispersing medium used in the preparation of the first polystyrene block must contain 15 to 60% by weight of a cycloalkane, preferably cyclohexane. Solvents are employed within such a range as being necessary to maintain a dispersion state in said solvent and for properly controlling stability of a polymer dispersion.

The preferred solvent for use as a dispersing medium in the present process is technical hexane with cyclohexane added to raise the total cyclohexane content to between 15 to 60% by weight of the total dispersing medium. Technical hexane is the raw hexane cut taken from a distillation column typically treating crude oil. Commercially available technical hexane compositions contain minor amounts of aromatic hydrocarbons and other aliphatic hydrocarbons including 5 to 9% of cyclohexane. After the preparation of the dispersing agent and the first styrene block, the remaining monomer charges to the reactor are fed in aliphatic hydrocarbon diluent, typically technical hexane, thereby greatly reducing the final percentage of cyclohexane in the reactor to less than 25% of total diluent. The block polymer product preferably contains 10 to 50% weight of solids relative to the liquid hydrocarbon dispersing medium to yield a fluid polymer dispersion that can be easily handled.

While it is believed that the soluble polyBd* or "b" dispersing agent can be prepared from any monomer providing a soluble block in the dispersing medium subject to known anionic polymerization constraints, it is preferred that the soluble "b" dispersing agent be selected from a polymer formed by polymerization of conjugated diene monomers or be selected from a copolymer formed by copolymerization of conjugated diene monomers and vinyl substituted aromatic monomers. The soluble "b" dispersing agent is most preferably selected from a polymer or a copolymer formed from 75 to 100 parts by weight, preferably 75 to 98 parts, of conjugated diene monomer contributed units and 0 to 25 parts by weight, preferably 2 to 25 parts, of vinyl substituted aromatic monomer contributed units with all polymer or copolymer blocks being soluble in the hydrocarbon dispersion medium. The first insoluble polystyrene "S" block is produced in the dispersion polymerization process during or after the formation of the dispersing agent.

The catalyst systems for use in preparing the block polymers and the dispersing agent are anionic initiators, preferably any organolithium catalyst known in the art as being useful in the polymerization of vinyl aromatic hydrocarbons and conjugated dienes. Suitable catalysts which initiate polymerization of the monomer system and dispersing agent include organolithium catalysts which have the formula $R(Li)_x$ wherein R represents a hydrocarbyl radical of 1 to 20, preferably 2–8, carbon atoms per R group, and x is an integer of 1–4, preferably 1 or 2. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formula include primary, secondary and tertiary groups such as methyl, ethyl, n-propyl, isopropyl, n-butyl, isobutyl, t-butyl, n-amyl, isoamyl, n-hexyl n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include: phenyllithium, naphthyllithium, 4-butylphenyllithium, p-tolyllithium, 4-phenylbutyllithium; 4-butyl-cyclohexyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4-dilithiobiphenyl, and the like.

Mixtures of different lithium catalysts can also be employed, preferably containing one or more lithium compounds such as $R(Li)_x$. Other lithium catalysts which can be employed are lithium dialkyl amines, lithium dialkyl phosphines, lithium alkyl aryl phosphines lithium diaryl phosphines and trialkyl tin lithium such as tributyl-tin-lithium. The preferred lithium catalyst for use in the present invention is n-butyllithium.

The amount of initiator to be used depends on the amount of monomer used and the molecular weights desired in the respective products. Under ideal conditions, where the polymerization system is free of impurities that will deactivate a portion of the initiator, the amount of initiator is determined by the amount of monomer being used for the initial block and the molecular weight desired in that block. Generally, in such polymerizations, each initiator molecule (or lithium atom) is responsible for the initiator of one polymer chain. Then for subsequent blocks, and providing no deactivating impurities have entered the system, sufficient monomer is added in each case to form the desired molecular weight in the respective blocks in accordance with the number of atoms of lithium present in the polymer being formed.

Anionic initiators are typically employed in catalytically effective amounts ranging from 0.2 millimoles to 100 millimoles of anionic initiator per hundred grams of monomer in the reaction vessel. Approximately 1 to 10 mmole, preferably 0.2 to 5.0 mmole of anionic initiator per hundred grams of monomer is preferred for use in the present process.

All amounts of anionic initiator are indicated by hundred grams of monomer or by molar ratios of components in the instant invention and are considered to be catalytically effective amounts, that is, effective amounts for initiating and conducting polymerization of the dispersing agent and the disclosed monomer systems to produce copolymers of the present invention.

Modifying agents such as ethers, tertiary amines, chelating ethers or amines, and sodium or potassium alkoxides or alkyls, may be added to increase the 1,2-addition reaction of the diene monomer in the block polymers. Such modifying agents are well known in the art, such as tetrahydrofuran, tetramethylethylene diamine, diethylether, bis-oxolanyl propane (OOPS), and the like, and these modifying agents may be employed in amounts generally ranging from 1:10 to 100:1 molar ratio of the modifier to anionic initiator. The 1,2-addition product can be increased from the 5 to 15% range to as high as 90% of the diene monomer units being incorporated into the "B" block of the block polymer.

After formation of the dispersing agent, a charge of vinyl aromatic hydrocarbon monomer is added to the reaction zone containing the "living" dispersing agent. The vinyl aromatic hydrocarbon monomer charge attaches to the "living" dispersing agent.

The desirability for close control over the molecular weight of each of the individual blocks is emphasized by the several major utilities desired for these products. The block polymer per se are strikingly useful as "self-vulcanizing" elastomers when the correct relationship exists between the proportions of the elastomeric to non-elastomeric blocks and the individual molecular weights thereof. If the molecular weights of the plastic (non-elastomeric) blocks such as the polystyrene blocks are unduly high, or present in too high a proportion relative to the elastomeric blocks, the copolymer exhibits relatively poor elastomeric properties although it may be useful for other purposes such as adhesives or high impact resistant replacements for the usual thermoplastics such as polystyrene, polyethylene and the like.

Another reason for maintaining close control over the individual block lengths is that there is a relatively critical relationship between the block lengths and the effectiveness of the block copolymer in modifying other elastomers, such as polymers of conjugated dienes. In the latter instance, the principal object is to improve the green strength and processibility characteristics of conjugated diene polymers. This objective is not realized to a maximum if the correct block lengths are not obtained. Furthermore, even if the average molecular weight of the individual block is within a target area, it has been found that this is not fully satisfactory if the average is merely that of a relatively wide spread in molecular weights. On the contrary, it is highly desirable to achieve polymer segments in which the molecular weights of the individual blocks are within a relatively narrow range. These objectives are better obtained by the use of secondary or tertiary alkyl lithium initiators.

The molecular weights of the individual blocks may be varied as stated hereinbefore, dependent upon the intended end use. For many purposes, such as use of the block copolymers as self-curing elastomers or for modification of conjugated diene elastomers, it is preferred to employ block polymers having the structure S-B-S wherein each S is an independently selected polymer block of styrene, the average molecular weight of each S being between about 10,000 and 100,000, B is a polymer block of a conjugated diene, the average molecular weight of the block being between about 30,000 and 150,000, the weight of the S blocks being less than about 50% by weight of the total copolymer.

In some cases, it may be desirable to have the center or polybutadiene block instead be a copolymer block made by random copolymerization of butadiene and styrene. In such cases, a mixture of butadiene and styrene may be added gradually during the formation of this block, or the styrene may be added first and butadiene added gradually. In this way, the copolymerization of styrene during the formation of the central block is insured.

The process of the present invention may be utilized to prepare a variety of block polymers and dispersants including b-S dispersant types. This present process utilizing the dispersant and the controlled solvent system may be used for preparing any block copolymers containing vinyl aromatic monomer contributed blocks and conjugated diene monomer contributed blocks having one or two terminal blocks formed from dispersing agents, so long as the dispersing agents are substantially soluble in alkane solvents such as hexane or technical hexane and said block copolymers when devoid of said terminal blocks being substantially insoluble in alkane solvents, by the steps of polymerizing the individual monomers to form the respective blocks, such polymerizations being initiated by a lithium compound. The polymerization of an initial block containing vinyl aromatic monomer contributed units is effected in a solvent comprising 15 to 60% by weight of cyclohexane and 40 to 85% by weight of an alkane such as hexane or technical hexane and the polymerization of the subsequent blocks is effected in a mixed solvent comprising 0 to 10% by weight of cyclohexane and 90 to 100% by weight of an alkane preferably consisting of hexane or technical hexane.

The block copolymers may be modified with extending oils, particularly those which are compatible with the elastomeric segment, or within pigments or polystyrene, any of which may be present in amounts between about 0 to 100 parts by weight per 100 part of the block copolymer.

Polymerization is advantageously conducted at temperatures in the range of −20° to about 100° C., preferably at temperatures between about 20° and 65° C., the temperature being controlled to yield the polymer product within a reasonable length of time. Polymerizations are generally performed in from 0.1 to 5 hours, preferably 0.5 to 5 hours, with the reaction proceeding essentially to completion.

While conducting the polymerization it is generally satisfactory to use 200–900 parts by weight of diluent per 100 parts of monomer. This gives a fluid polymer solution or dispersion which can be easily handled.

Polymerization is advantageously performed in an agitated, pressurized reactor which may be jacketed to allow for temperature control. Pressures are generally autogenous, although inert gases can be charge to the reactor to increase the pressure, if desired. Dry nitrogen, argon, helium or other inert gas can be used for this purpose. Normally, pressures will be atmospheric or above, and can be as high as 10 atmospheres or more.

Samples may be withdrawn from the reactor periodically during the polymerization to determine percent conversion (by measuring the total solids), color and character of the reaction mass, etc.

When the polymerization has progressed to the desired degree, the product is dropped or run into isopropanol or other medium which deactivates the initiator and precipitates the polymer product. Generally, an amount of isopropanol equal in weight to the amount of hexane used is satisfactory for this purpose. It is advantageous also to have an antioxidant, such as approximately 1% of di-tertiarybutyl-para-cresol, in the isopropanol. The polymer precipitate is recovered and drum-dried to remove solvent, since the solvent consists primarily of lower boiling point alkanes The elastomers produced according to this invention may be mixed with the usual rubber compounding materials such as carbon blacks, fillers, processing oils and the like and still provide satisfactory physical properties. Preferably the elastomeric mid-sections of the block copolymer should have lengths corresponding approximately to the average molecular weight between cross-links of normal vulcanized rubber. Since the subject block copolymers may be utilized without vulcanization, the molecular weights of the end groups should be high enough to prevent movement of the chain ends under the applied stress in the time intervals of its application.

The subject block copolymers are not only useful per se for the information of injection moldings, compression moldings, extrusions, film coatings, spray coatings or adhesives, but also for the formation of latices from which foam or dipped goods may be prepared as well as in compositions with other rubbers for the improvement in physical properties of the latter.

The block copolymers are especially useful for improving the processibility of synthetic rubbers, especially elastomeric homopolymeric and random copolymeric olefinic (including mono- and diolefinic) particularly of conjugated dienes for the particular purpose of improving green strength thereof. This is especially noticeable when the subject block copolymers are present in an amount of 5–50% by weight based on the total rubber content. Such blends have a bulk consistency 10–50 times greater than that of the unmodified rubber and greatly reduces bulk flow with no impairment of dynamic properties of carbon black vulcanizates made therefrom.

SPECIFIC EMBODIMENTS OF THE INVENTION

The invention is illustrated by the following examples which are intended merely for purpose of illustration and are not to be regarded as limiting the scope of the invention or the manner in which it may be practiced.

COMPARATIVE EXAMPLE A

A bottle was charged with 12.0 grams of a 24.2% by weight solution of 1,3-butadiene in hexane, 5.4 mmoles of n-BuLi and polymerized for 65° C. for 30 minutes to form a dispersing agent.

A one gallon stirred pressurized stainless steel tank reactor purged with nitrogen was charged with 2.12 lbs. of technical hexane containing 7.10% by weight of cyclohexane, 0.60 lbs. of 33% by weight solution of styrene in hexane and the polymerized polybutadiene dispersing agent from the bottle. The polymerization mix was polymerized at 65° C. for thirty minutes. A charge of 1.90 lbs. of 24.2% by weight solution of 1,3-butadiene in hexane was added to the reactor and polymerized at 65° C. for 90 minutes. The resulting block polymer was then coupled by charging 2.2 mmole of $(CH_3)_2SiCl_2$ into the reactor. The solvent was removed by evaporative drying and the physical properties of the recovered coupled block polymer is displayed in Table 1.

COMPARATIVE EXAMPLE B

The procedure of comparative Example A was followed except that an additional charge of 6% by weight of cyclohexane was added to the reactor during the initial addition of the 2.12 lbs. of technical hexane. The physical properties of the recovered coupled block polymer are displayed in Table 1.

EXAMPLES 1 TO 4

In each of these examples the procedure of comparative Example A was followed, however, as in Comparative Example B, an additional amount of cyclohexane was added to the reactor during the addition of the 2.12 lbs. of technical hexane to increase the percentage of cyclohexane in the solvent to the amounts displayed in Table 1. The physical properties of the recovered coupled block polymers are also displayed in Table 1. In Table 1 the % cyclohexane in the 1st step is the weight percentage of total cyclohexane present in the solvent used in the dispersion polymerization of the first styrene block. The remainder of the solvent was technical hexane. The % cyclohexane final displays the weight percentage of total cyclohexane present in the total solvent present in the final S-B-S block copolymer.

TABLE 1

| | Example No. | | | | | |
|---|---|---|---|---|---|---|
| | Comp. Ex. A | Comp. Ex. B | 1 | 2 | 3 | 4 |
| total % cyclohexane in | | | | | | |
| 1st Step | 7.10% | 13.10% | 18.50% | 24.20% | 29.40% | 34.50% |
| Final Step | 7.10% | 10.10% | 13.20% | 16.20% | 19.30% | 22.40% |
| % dispersing agent[1] | 1 | 1 | 1 | 1 | 1 | 1 |
| n-BuLi phgm | 5.4 | 5.4 | 5.4 | 5.4 | 5.4 | 5.4 |
| Reaction Temp ° F. | 140–155 | 140–155 | 140–155 | 140–155 | 140–155 | 140–155 |
| (Si dimethyl $Cl_2$) Cl/Li | 0.8 | 0.8 | 0.8 | 0.8 | 0.8 | 0.8 |
| % solids in dispersion | 13 | 13 | 13 | 13 | 13 | 13 |
| mold sample appearance of SBS | blue, cloudy | blue, cloudy | blue | clear | clear | clear |
| H NMR | | | | | | |
| % vinyl | 8.6 | 8.4 | 8.4 | 9.5 | 8.6 | 8.6 |
| % styrene | 32.6 | 32.8 | 33.2 | 34 | 33.6 | 32.7 |
| % block styrene | 100.7 | 100.6 | 99.2 | 98.6 | 97.5 | 99.1 |
| GPC | | | | | | |
| Mn | 56,200 | 57,600 | 61,300 | 66,000 | 62,100 | 71,700 |
| Mw | 139,800 | 155,300 | 131,500 | 117,000 | 105,900 | 106,200 |
| Mp | 53,800 | 55,300 | 59,300 | 69,000 | 72,700 | 80,100 |
| Mw/Mn | 2.49 | 2.69 | 2.14 | 1.77 | 1.71 | 1.48 |
| Final total % cyclohexane | 7.10% | 10.10% | 13.20% | 16.20% | 19.30% | 22.40% |
| % coupled (Peakfit analysis) | 53% | 44% | 59% | 67% | 66% | 74% |
| TENSILE microdumbbell | | | | | | |
| $T_b$ (psi)[2] | 1195 | 1026 | 1417 | 1630 | 1748 | 1874 |
| % Strain[3] | 1036 | 915 | 1066 | 917 | 1029 | 1054 |
| 300% MOD[4] | 308 | 321 | 334 | 358 | 360 | 305 |

[1]weight percent of dispersing agent in total block copolymer
[2]tensile strength at break
[3]percent elongation at break
[4]tensile strength at 300% elongation While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

We claim:

1. A process for preparing block copolymers predominantly of a structure S-B-S with at least one polybutadiene terminal block, wherein S represents a block of polystyrene and B represents a block of polybutadiene, the process comprising the steps of:

(a) reacting a hydrocarbyl lithium having up to 10 carbon atoms with an appropriate amount of butadiene to form a block of polybutadiene representing 2–12 parts by weight per 100 parts by weight of the first block polystyrene to which this initial block polybutadiene will be attached and thereby produce a polybutadiene*-Li precursor;

(b) adding styrene to the polybutadiene*-Li precursor of step (a) and effecting polymerization of said styrene with said polybutadiene*-Li precursor in a solvent of 15 to 60% by weight cyclohexane and 40 to 85% by weight alkane to give a polybutadiene*-polystyrene-Li product;

(c) thereafter adding butadiene in an alkane diluent to the polybutadiene*-polystyrene-Li product of step (b) and effecting polymerization of said butadiene with said polybutadiene*-polystyrene-Li product to give a polybutadiene*-polystyrene-polybutadiene-Li product while dispersed in a 0–10% cyclohexane and 90–100% alkane solvent; and (d) thereafter effecting the addition of a second polystyrene block onto said polybutadiene*-polystyrene-polybutadiene-Li product.

2. The process of claim 1 in which the addition of said second block of polystyrene is effected by the reaction of a coupling agent with said polybutadiene*-polystyrene-polybutadiene-Li.

3. The process of claim 2 in which said coupling agent is selected from the class consisting of $CCl_4$, secondary-butyl chloride, carbon monoxide, an alkyl dichloride of 1–10 carbon atoms, $R_2SiCl_2$, $RSiCl_3$, $SiCl_4$, poly($PNCl_2$), divinylbenzene, alkyl esters, alkyl diesters, alkyl triesters, and $CCl_3COOR$ where R is an alkyl group of 1–10 carbon atoms.

4. The process of claim 3 in which said coupling agent is dimethyl $SiCl_2$.

5. The process of claim 1 in which said second block of polystyrene is added by effecting polymerization of an additional amount of styrene with said polybutadiene*-polystyrene-polybutadiene-Li.

6. The process of claim 1 in which said hydrocarbyl lithium compound is selected from the class consisting of secondary and tertiary alkyl lithium compounds of 4–8 carbon atoms.

7. The process of claim 6 in which said hydrocarbyl lithium compound is a secondary alkyl lithium compound of 4–8 carbon atoms.

8. The process of claim 7 in which said hydrocarbyl lithium compound is secondary-butyl lithium.

9. The process of claim 8 in which said hydrocarbyl lithium compound is n-butyl lithium.

10. The process of claim 1 in which said initial block of polybutadiene represents 5–10 parts by weight per weight of the block of polystyrene to which this initial block of polybutadiene is attached.

11. A dispersion polymerization process for preparing a block polymer having high tensile strength comprising:

(1) forming a polymerization mixture including vinyl aromatic monomer, a lithium-terminated polydiene dispersing agent and a dispersing medium comprising aliphatic hydrocarbons and 15 to 60% by weight of cyclohexane and polymerizing the vinyl aromatic monomer until substantially complete conversion to a first living vinyl aromatic block, S, wherein said lithium-terminated polydiene dispersing agent comprises 2–12 pbw per 100 pbw of the adjacent S block;

(2) adding conjugated diene monomer in an aliphatic hydrocarbon diluent to the polymerization mixture and polymerizing the conjugated diene monomer until substantially complete conversion to form a diblock polymer S-B; and (3) adding to the polymerization mixture a coupling agent, X having a functionality n or 2 to 6 and allowing chains of said diblock polymer to couple so as to form a final block polymer having the structural formula S-B-X-(B-S)$_{n-1}$.

12. A dispersion polymerization process for preparing block copolymers having high tensile strength comprising:

(1) forming a polymerization mixture including vinyl aromatic monomer, a lithium-terminated polydiene dispersing agent and a dispersing medium comprising aliphatic hydrocarbons and 15 to 60% by weight of cyclohexane and polymerizing the vinyl aromatic monomer until substantially complete conversion to form a first vinyl aromatic block S, wherein said lithium-terminated polydiene dispersing agent comprises 2–12 pbw per 100 pbw of the adjacent S block:

(2) adding conjugated diene monomer to the polymerization mixture in an aliphatic hydrocarbon diluent and polymerizing the conjugated diene monomer until substantially complete conversion to form a diblock polymer S-B; and (3) adding to the polymerization mixture a vinyl aromatic monomer and polymerizing the vinyl aromatic monomer to form a terminal block $S_1$ on the S-B diblock polymer to form a S-B-S block polymer.

13. In the process of preparing block copolymers predominantly of the structure S-B-S with one or two diene containing dispersing agent blocks, wherein S represents a block of polystyrene and B represents a block of polydiene, by the steps of polymerizing the individual monomers to form the respective blocks, such polymerization being initiated by a lithium compound, the improvement whereby:

(a) said polymerization of the initial S block is effected in a solvent comprising 15 to 60% weight of cyclohexane and 40 to 85% by weight of an alkane and the polymerization of the subsequent block is effected in a mixed solvent comprising 0 to 10% by weight of cyclohexane and 90 to 100% by weight of an alkane;

(b) said polymerization is initiated by a hydrocarbyl lithium compound having up to 10 carbon atoms;

(c) as a precursor to the preparation of a first block of polystyrene, there is prepared initially a block of a dispersing agent in an amount ranging from 2–12 parts by weight per 100 parts by weight of the block polystyrene to which the dispersing agent block is attached, by reacting said hydrocarbyl lithium with an appropriate amount of conjugated diene to give said dispersing agent block and thereby produce a polydiene*-Li product, wherein * indicates said dispersing agent block;

(d) sufficient styrene is added to the product of step (c) to give the desired molecular weight of the desired first S block and effecting polymerization of said styrene with said polydiene*-Li to give the product polydiene*polystyrene-Li while still dispersed in said mixture of cyclohexane and alkane solvent;

(e) thereafter adding an appropriate amount of diene in an alkane diluent to the dispersed product of step (d) to form a desired size block of polydiene and effecting polymerization of said diene with said polydiene*-polystyrene-Li to give the product polydiene*-polystyrene-polydiene-Li while still dispersed in said cyclohexane and alkane solvent; and (f) thereafter affecting the addition of a second block of polystyrene onto said polydiene*-polystyrene-polydiene-Li.

14. In a process of preparing block copolymers containing vinyl aromatic monomer contributed blocks and conjugated diene monomer contributed blocks and having one or two terminal blocks formed from dispersing agents; said dispersing agents being substantially soluble in alkane solvents, allowing a stable dispersion to form which facilitates substantially complete conversion of a first vinyl aromatic block S, by the steps of polymerizing the individual monomers to form the respective blocks, such polymerizations being initiated by a lithium compound, the improvement whereby:

polymerization of an initial block containing vinyl aromatic monomer contributed units is affected in a solvent comprising 15 to 60% by weight of cyclohexane and 40 to 85% by weight of an alkane and the polymerization of the subsequent blocks is effected in a mixed solvent comprising 0 to 10% by weight of cyclohexane and 90 to 100% by weight of an alkane consisting essentially of hexane or technical hexane.

15. The process of claim 14 in which a block of a dispersing agent comprising conjugated diene monomer contributed units in an amount ranging from 2–12 parts by weight per 100 parts by weight of the initial block is attached to the initial block containing vinyl aromatic monomer contributed units, by reacting said hydrocarbyl lithium with an appropriate amount of conjugated diene to give said dispersing agent block and thereby produce a polydiene*-Li product, wherein * indicates said small dispersing agent block;

adding sufficient vinyl aromatic monomer to the polydiene*-Li product to give the desired molecular weight of the desired first S block and effecting polymerization of said styrene with said polydiene*-Li to give the product polydiene*-poly(vinyl aromatic)-Li while still dispersed in said mixture of cyclohexane and alkane solvent;

adding an appropriate amount of diene in an alkane diluent to the dispersed product to form a desired size block of polydiene and effecting polymerization of said diene with said polydiene*-poly(vinyl aromatic)-Li to give the product polydiene*-poly(vinyl aromatic)-polydiene-Li while still dispersed in said cyclohexane and alkane solvent; and thereafter effecting the addition of a second block of a poly(vinyl aromatic) onto said polydiene*-poly(vinyl aromatic)-polydiene-Li.

* * * * *